(12) United States Patent
Djuphammar

(10) Patent No.: US 7,054,290 B1
(45) Date of Patent: May 30, 2006

(54) METHODS AND APPARATUS FOR DUAL MODE OPERATION IN A WIRELESS COMMUNICATION SYSTEM

(75) Inventor: Hakan O. Djuphammar, Nacka (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 849 days.

(21) Appl. No.: 09/693,575

(22) Filed: Oct. 19, 2000

Related U.S. Application Data

(60) Provisional application No. 60/187,547, filed on Mar. 7, 2000.

(51) Int. Cl.
*H04Q 7/00* (2006.01)

(52) U.S. Cl. .................. 370/331; 370/335; 370/336; 370/352; 455/437

(58) Field of Classification Search ........ 370/352–356, 370/342, 465–466, 331, 335, 328–329, 338, 370/336, 345, 347; 455/436, 432, 434, 442, 455/437
See application file for complete search history.

(56) References Cited

U.S. PATENT DOCUMENTS

| | | | | |
|---|---|---|---|---|
| 5,533,014 | A * | 7/1996 | Willars et al. ............... | 370/335 |
| 5,754,961 | A * | 5/1998 | Serizawa et al. ............ | 455/517 |
| 5,845,215 | A * | 12/1998 | Henry et al. ............. | 455/426.1 |
| 5,881,060 | A * | 3/1999 | Morrow et al. ............. | 370/337 |
| 5,936,952 | A | 8/1999 | Lecomte | |
| 6,157,845 | A * | 12/2000 | Henry et al. ............. | 455/426.1 |
| 6,292,474 | B1 * | 9/2001 | Ali et al. .................... | 370/328 |
| 6,334,062 | B1 * | 12/2001 | Cashman ................. | 455/553.1 |
| 6,385,179 | B1 * | 5/2002 | Malcolm et al. ............. | 370/329 |
| 6,389,008 | B1 * | 5/2002 | Lupien et al. ............... | 370/352 |
| 6,463,054 | B1 * | 10/2002 | Mazur et al. ................ | 370/352 |
| 6,597,679 | B1 * | 7/2003 | Willars ........................ | 370/342 |
| 6,665,284 | B1 * | 12/2003 | Tran et al. ................... | 370/334 |
| 6,711,142 | B1 * | 3/2004 | Suzuki et al. ................ | 370/329 |
| 6,879,580 | B1 * | 4/2005 | Djuphammar et al. ....... | 370/352 |

FOREIGN PATENT DOCUMENTS

| | | |
|---|---|---|
| GB | 2 301 992 | 12/1996 |
| WO | WO 95/25407 | 9/1995 |
| WO | WO 95/31060 | 11/1995 |
| WO | WO 99/16266 | 4/1999 |
| WO | WO 99/49690 | 9/1999 |
| WO | WO 99/52236 | 10/1999 |
| WO | WO99/63774 | 12/1999 |

OTHER PUBLICATIONS

Melissa A. Sanzo, "CDMA's Data Evolution," Mar. 15, 1999, http://wireessreview.com/ar/wireless_cdmas_data_evolution/.*

Chaudhury P, et al., "The 3GPP Proposal for IMT-2000", IEEE Communications Magazine, Dec. 1999, pp. 72-81.

(Continued)

*Primary Examiner*—Ricky Q. Ngo
*Assistant Examiner*—Nittaya Juntima
(74) *Attorney, Agent, or Firm*—Coats & Bennett, P.L.L.C.

(57) ABSTRACT

A wireless network terminal tunes to a high data rate ("HDR") HDR carrier when in an idle state. The terminal periodically scans a 1xRTT carrier for pages, SMS and other information. Should the scan detect an incoming communication on the 1xRTT carrier, any existing HDR packet session is terminated so that the terminal may tune to the 1xRTT carrier to receive the incoming communication. If the coverage area does not support an HDR carrier, the terminal tunes to the 1xRTT carrier and periodically scans for an HDR carrier.

50 Claims, 5 Drawing Sheets

OTHER PUBLICATIONS

Digital Cellular Telecommunications System (Phase 2+), General Packet Radio Service (GPRS), Service description, Stage 2 (GSM 03.60 version 7.1.1 Release 1998, ETSI Standard, Jan. 1, 2000, pp. 1-115.

* cited by examiner

METHODS AND APPARATUS FOR DUAL MODE OPERATION IN A WIRELESS COMMUNICATION SYSTEM

CROSS REFERENCE TO RELATED APPLICATIONS

This application claims the benefit of priority to U.S. Provisional Application Ser. No. 60/187,547, filed Mar. 7, 2000.

FIELD OF THE INVENTION

The present invention relates to wireless communication systems. More particularly, the present invention pertains to methods and apparatus for dual mode operation in a wireless communication system.

BACKGROUND OF THE INVENTION

The third generation (or "3G") of wireless communication services promises to bring unity to a fractured worldwide cellular market. 3G systems will permit seamless travel not presently available in the splintered U.S. mobile telephone service. In addition, 3G systems promise a wide array of high-speed broadband data transmission and processing, including video, on-board navigation, and Internet access.

One wireless standard designed to support 3G services is cdma2000™, defined by the ITU in its IMT-2000 vision. Phase one of the cdma2000 standard effort, known as "1×RTT" (i.e., Radio Transmission Technology), has already been completed and published by the Telecommunications Industry Association (TIA). 1×RTT refers to cdma2000 implementation within existing spectrum allocations for cdmaOne—1.25 MHz carriers. The technical term is derived from N=1 (i.e., use of the same 1.25 MHz carrier as in cdmaOne) and the "1×" means one time 1.25 MHz. 1×RTT is backward compatible with cdmaONE networks, but offers twice the voice capacity, data rates of up to 144 kbps, and overall quality improvements.

Also employing a 1.25 MHz channel is the High Data Rate (HDR) technology. HDR is RF compatible with cdmaOne and 1×RTT systems and permits side-by-side deployment of transmitters and antennas in existing CDMA towers. Unlike 1×RTT, which is optimized for circuit switched services, HDR is spectrally optimized for best effort packet data transmission. HDR delivers very high-speed CDMA wireless Internet access at peak data rates greater than 1.8 Megabits per second. Notably, unlike 1×RTT, the control and data channel in an HDR carrier are time multiplexed.

Because of its high speed Internet access, it is preferable to conduct data communications over an HDR carrier, rather than on a 1×RTT carrier. Nevertheless, because HDR is packet based, it does not accommodate real time applications very well. Thus, a user of an HDR carrier who wishes to place a voice communication would need to use a carrier such as 1×RTT. U.S. patent application Ser. No. 09/474,056, filed Dec. 28, 1999, which is fully incorporated herein by reference, discloses a hybrid network supporting both 1×RTT and HDR carriers. The hybrid network coordinates communication over either the 1×RTT or the HDR carrier as circumstances dictate. Such a hybrid network, however, requires the changes necessary in 1×RTT and HDR protocol to support this coordination.

SUMMARY OF THE INVENTION

In accordance with a first aspect of the invention, methods and apparatus are provided for transferring communications at a terminal within an overlapping coverage area having an all-services carrier and a best-efforts carrier, wherein the all-services carrier supports real-time and non-real-time services and the best-efforts carrier supports only non-real-time services. In one embodiment, the all-services carrier is a 1×RTT carrier and the best-efforts carrier is an HDR carrier. (Note: There are always two carriers for both 1×RTT and HDR: one for the forward link and one for the reverse link. As used herein, "carrier" will collectively refer to both the forward and reverse link carriers.)

In a preferred embodiment, a terminal tunes to a HDR carrier when in an idle state. The terminal periodically scans a 1×RTT carrier for pages, SMS and other information such as information sent via wavelength communications. Should the scan detect an incoming communication on the 1×RTT carrier, any existing HDR packet data communication is terminated so that the terminal may tune to the 1×RTT carrier to receive the incoming communication. If the coverage area does not support an HDR carrier, the terminal tunes to the 1×RTT carrier and periodically scans for an HDR carrier.

In another preferred embodiment, a terminal is provided with a transceiver capable of being tuned to a HDR carrier or to a 1×RTT carrier, and a processor capable of tuning the transceiver based on the type of communication the terminal is engaged in. Thus, the processor tunes the transceiver to a HDR carrier for non-real-time packet data communications, and to a 1×RTT carrier for voice communications or packet data communications.

In accordance with another aspect of the invention, a wireless communications network includes an HDR carrier for non-real-time packet data communications, a 1×RTT carrier for 1×RTT communications or packet data communications, and a plurality of terminals. Each terminal is provided with a transceiver capable of being tuned to a HDR carrier or to a 1×RTT carrier, and a processor capable of tuning the transceiver based on the type of communication the terminal is engaged in, such as the terminal described above.

As will be apparent to those skilled in the art, other and further aspects and advantages of the present invention will appear hereinafter.

BRIEF DESCRIPTION OF THE DRAWINGS

Preferred embodiments of the present invention are illustrated by way of example, and not by way of limitation, in the figures of the accompanying drawings, in which like reference numerals refer to like components, and in which.

DETAILED DESCRIPTION OF THE PREFERRED EMBODIMENTS

Figure 1:
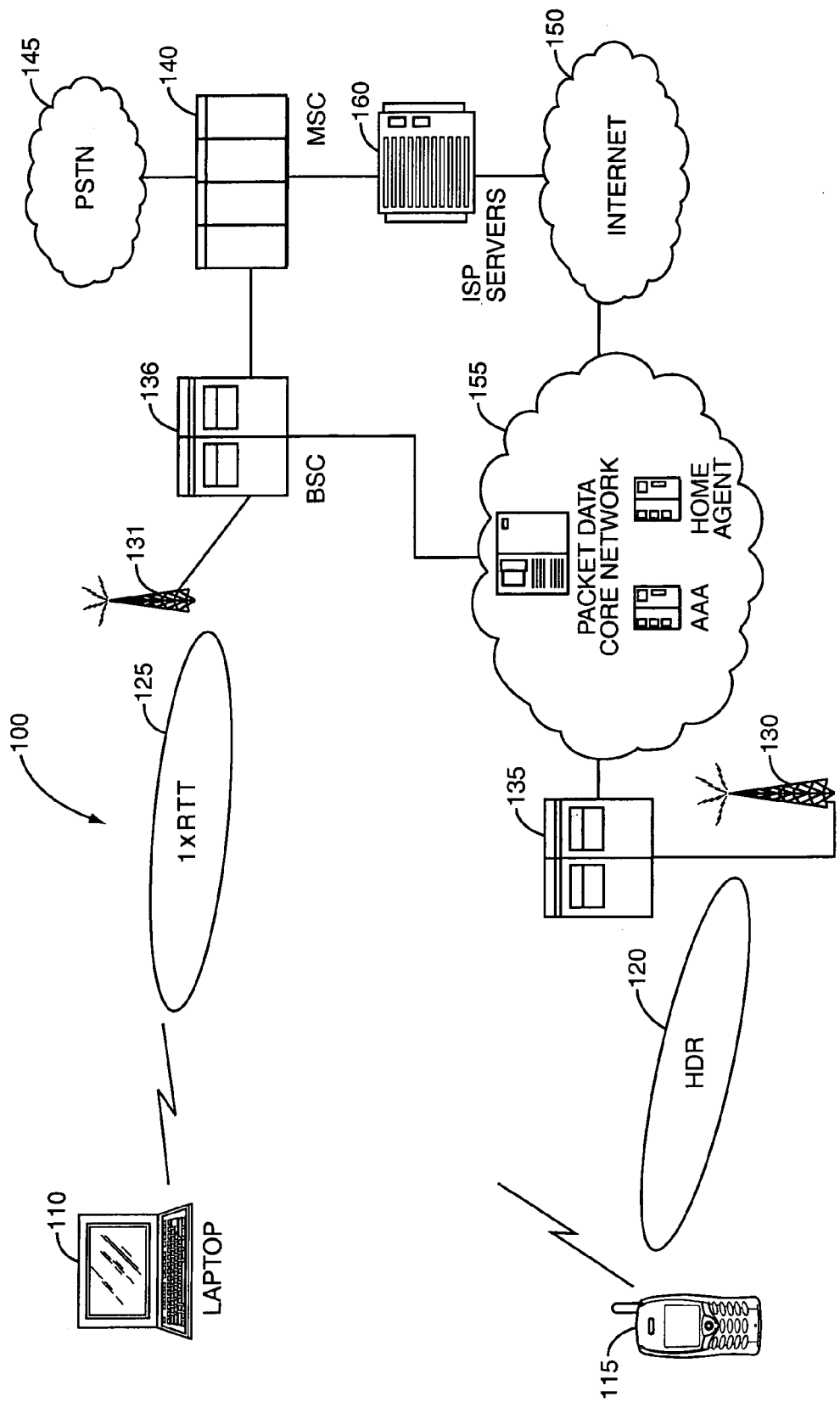
FIG. 1 is a block diagram of both a 1×RTT and an HDR network having an overlapping coverage area.

FIG. 1 illustrates coverage area 100 supported by both a 1×RTT and an HDR network. Users at terminals such as a laptop computer 110 having a wireless transceiver or a handset 115 may communicate over either an HDR carrier 120 or a 1×RTT carrier 125 as long as the terminal is configured for dual mode operation. The 1×RTT carrier 125 carries 1×RTT communications, which may include voice, packet data, or other multi services such as Short Message Services (SMS) or broadcast information services. The HDR carrier 120 is a carrier used only for the transmission of non-real-time packet data. An HDR transmitter 130 under the control of an HDR base station controller 135 transmits the HDR carrier 120. The HDR base station controller 135 couples to a packet data core network 155. Packet data from the Internet 150 couples through the packet data core network 155 to the HDR base station controller and ultimately to the terminals 110 and 115.

Voice communications are carried only by the 1×RTT carrier 125 transmitted by a 1×RTT transmitter 131 under the control of a 1×RTT base station controller 136. A mobile switching center 140 connects a public switched telephone network (PSTN) 145 with the 1×RTT base station controller 136. Packet data from the Internet 150 couples to the mobile switching center 140 through an ISP server 160. Alternatively, packet data can be connected directly to BSC 136 through the packet data core 155.

Unlike the hybrid network disclosed in the above-incorporated application Ser. No. 09/474,056, the 1×RTT and HDR carriers are separate and independent. Rather than having the network supply the coordination between these carriers, the present invention uses intelligence supplied by the terminals to control whether communications will be received on a given carrier. Thus, the present invention may be denoted a "terminal-centric" approach in contrast to the "network-centric" approach disclosed in application Ser. No. 09/474,056.

Towards this end, the present invention has two main embodiments: one in which packet data communications are not transferred between the HDR and 1×RTT carriers, and one in which packet data communications are transferred between the HDR and 1×RTT carriers using standard 1×RTT packet data hand-over procedures. It should be noted that acquiring a carrier signal usually encompasses the steps of tuning the terminal to the correct frequency, synchronizing the terminal timing to the correct network timing, and then registering with the network. This process is well known in the art, however, and the invention does not depend on any particular method of acquiring a carrier. Therefore, in the discussion below, the process of acquiring a carrier will simply be referred to as tuning the terminal to the carrier. The first embodiment will now be described further:

No Packet Data Hand-Over Embodiment

Figure 2:
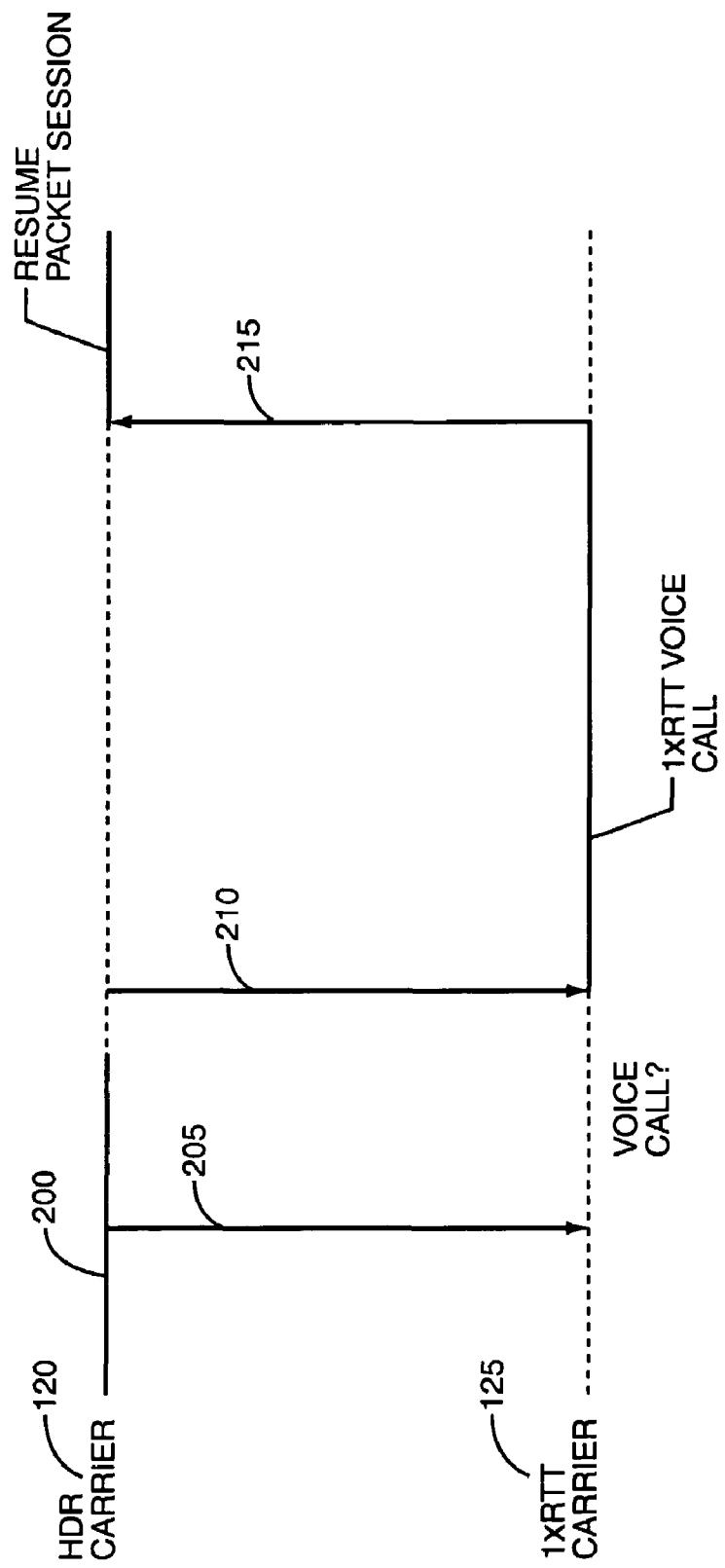
FIG. 2 is a communication flow diagram according to one embodiment of the invention.

In this embodiment the terminal tunes to the HDR carrier as the default carrier if this carrier is available. A sample communication flow procedure is illustrated in FIG. 2. Here, the HDR carrier 120 is available so that the terminal "camps on" and monitors this channel. The user then initiates one or more non-real-time packet data communications over the HDR carrier 120 at step 200. As demonstrated at steps 205 and 210, the terminal may periodically place the HDR packet data communication on hold and tune to the 1×RTT carrier to look for incoming 1×RTT communications directed to the terminal over the 1×RTT carrier. At step 205, because no voice communications were detected on the 1×RTT carrier, the terminal returns to the HDR carrier and resumes the non-real-time packet data communication. At step 210, however, the terminal detects an incoming 1×RTT communication on the 1×RTT carrier. Thus, the terminal automatically discontinues the HDR packet data communication and establishes an active 1×RTT communication. Upon termination of the 1×RTT communication at step 215, the terminal tunes to the HDR carrier to re-establish the HDR packet data communication. In an alternative embodiment, the terminal may query the user whether or not to accept the incoming 1×RTT communication at step 210. In such a case, only an affirmative response by the user would lead to establishment of the active 1×RTT communication. Otherwise, the terminal would return to the HDR carrier and re-establish the HDR packet data communication. For example, where the incoming 1×RTT communication is a voice communication, the terminal tunes to the 1×RTT carrier and establishes a voice communication. Once the voice communication is terminated, the terminal tunes to the HDR carrier to re-establish any HDR packet data communications that the terminal was previously engaged in.

When a user of the terminal initiates a 1×RTT communication, such as a voice communication, the communication must be carried out over the 1×RTT carrier. This can be illustrated in FIG. 2. Therefore, if a non-real-time packet data communication is in progress over the HDR carrier (step 200) when the user initiates a voice communication, then the non-real-time packet data communication must be put on hold while the terminal is tuned to the 1×RTT carrier (step 210). The voice communication is then commenced on the 1×RTT carrier. Upon termination of the voice communication, the terminal is tuned to the HDR carrier and the non-real-time packet data communication is re-established (step 215).

Figure 3:
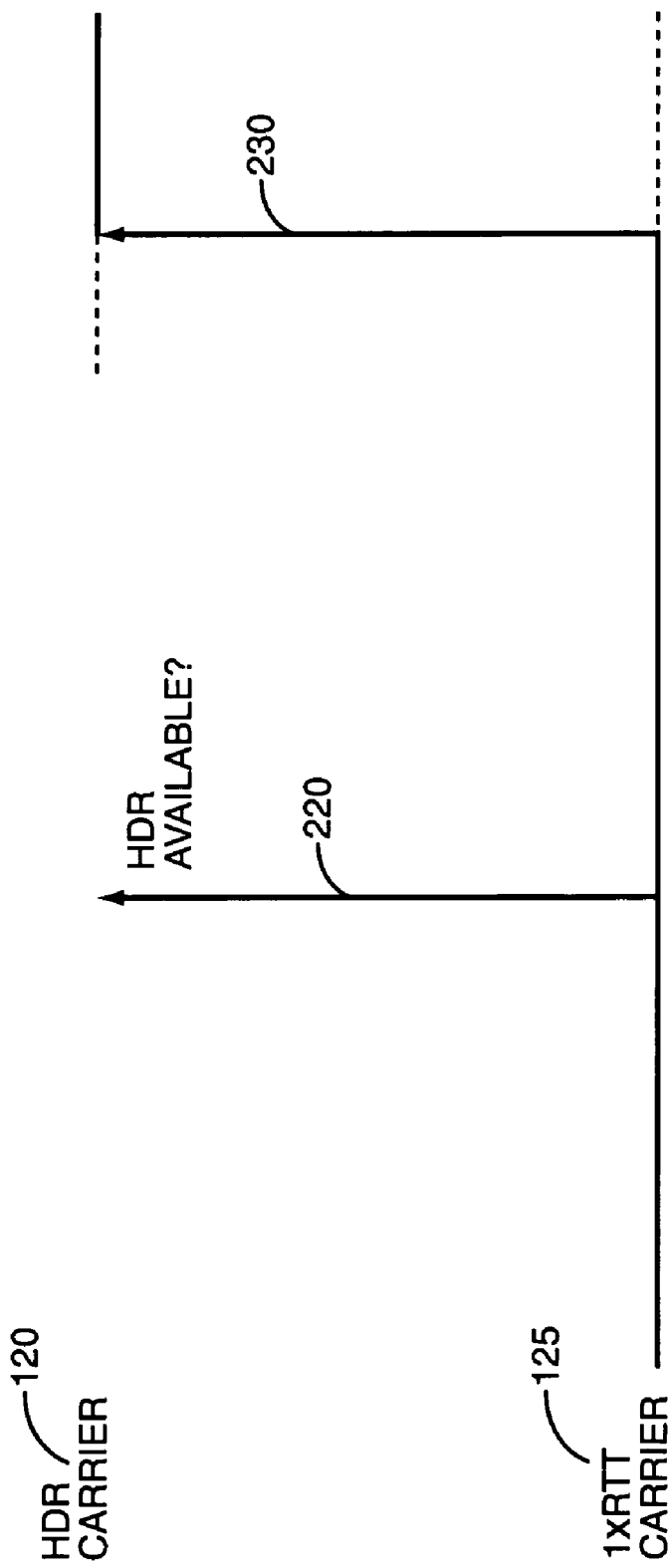
FIG. 3 is a communication flow diagram according to one embodiment of the invention.

Note that the above scenarios require the terminal to be in the footprint or coverage area of both an HDR and a 1×RTT transmitter. FIG. 3 presents the communication flow scenario if an HDR carrier is unavailable. Because the default mode is to camp on the HDR carrier, the terminal will periodically scan for the availability of the HDR carrier at steps 220 and 230. At step 220, no HDR carrier is available so the terminal must re-tune to the 1×RTT carrier. However, at step 230, the terminal, having moved into an area of HDR coverage, detects and tunes to the HDR carrier. Note that if a 1×RTT packet data communication had been established prior to step 230, this 1×RTT packet data communication would have to be terminated before the terminal could camp on the HDR carrier. Subsequent to step 230, the terminal could re-establish the packet data communication on the HDR carrier.

1×RTT Packet Data Hand-Over Embodiment

Figure 4:
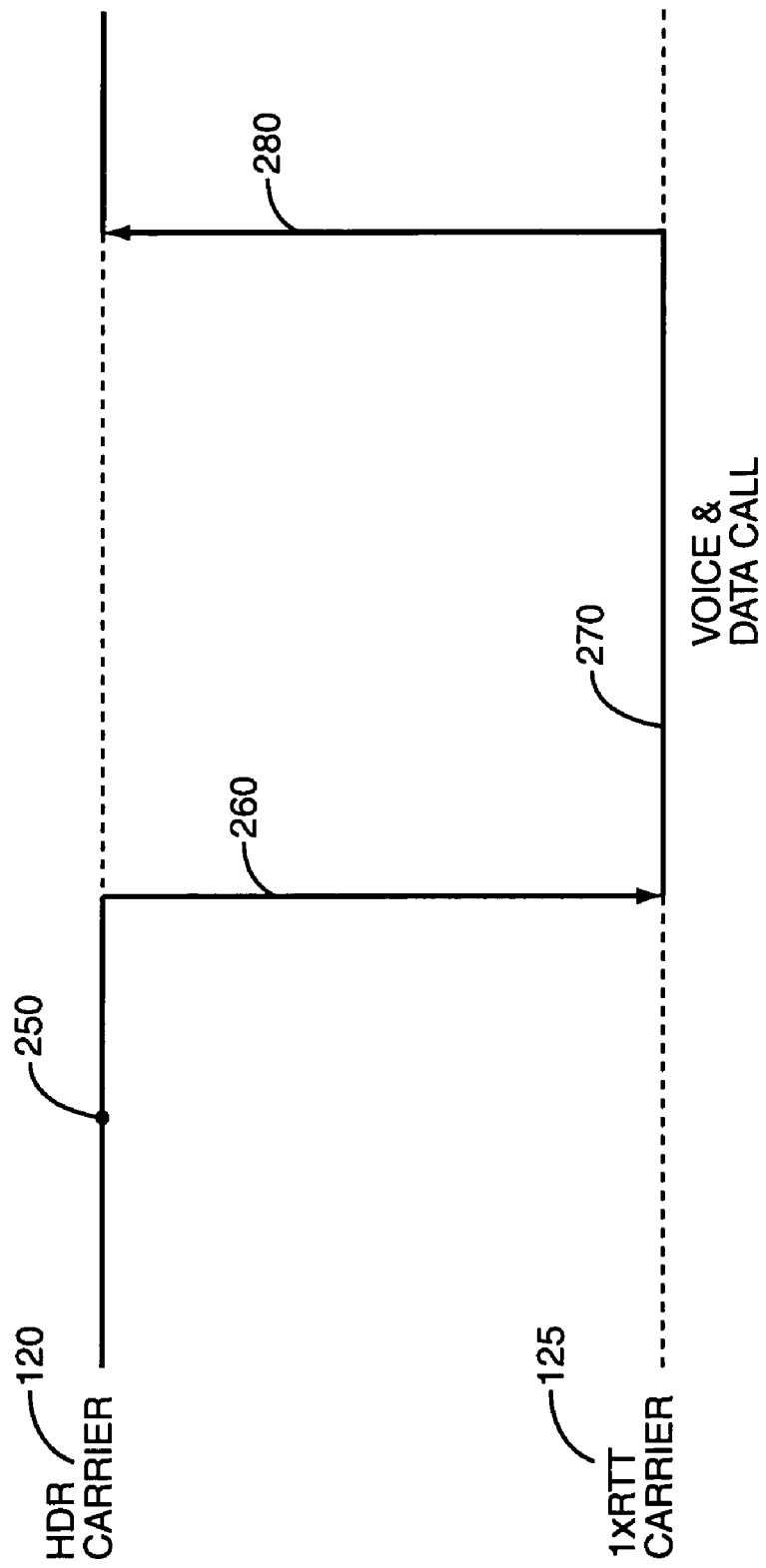
FIG. 4 is a communication flow diagram according to one embodiment of the invention.

This embodiment differs from the previously-described embodiment by employing basic 1×RTT packet data hand-over procedures to maintain continuity of packet data communications between the HDR and 1×RTT carriers. FIG. 4 shows the communication flow for a transition from HDR to the 1×RTT carrier. At step 250, the terminal establishes an HDR packet data communication. At step 260, the terminal tunes to the 1×RTT carrier to establish a 1×RTT communication. The impetus to tune to the 1×RTT carrier may have resulted from a periodic scan such as discussed with respect to FIG. 2 or may have resulted from the user desiring to place a voice communication. Because the terminal is tuned to the 1×RTT carrier while an active HDR packet data communication is in progress, the terminal sends a hand-over request to the network prior to step 260. As the terminal tunes to the 1×RTT network, a standard 1×RTT packet hand-over procedure is followed to transfer the packet data communication to the 1×RTT carrier. Thus, at step 270, an active 1×RTT and an active data communication are present on the 1×RTT carrier. Upon termination of the 1×RTT communication at step 280, the terminal again sends a 1×RTT hand-over request to the network with information about the target HDR base station controller.

Just as discussed with respect to FIG. 3, the terminal may be in an area not supporting an HDR carrier. The terminal would, while camping on the 1×RTT carrier, periodically scan for the presence of an HDR carrier. Upon detecting the HDR carrier, should the terminal have an active 1×RTT packet data communication in progress, it will send a 1×RTT hand-over request to the network as discussed with respect to FIG. 4. The request should contain information about the target base station controller. In addition, point-to-point protocol (PPP) state information will be transferred between the HDR and 1×RTT base station controllers. Upon acknowledgement from the network of the hand-over request, the terminal tunes to the HDR carrier and the packet data communication resumes as a non-real-time packet data communication.

Figure 5:
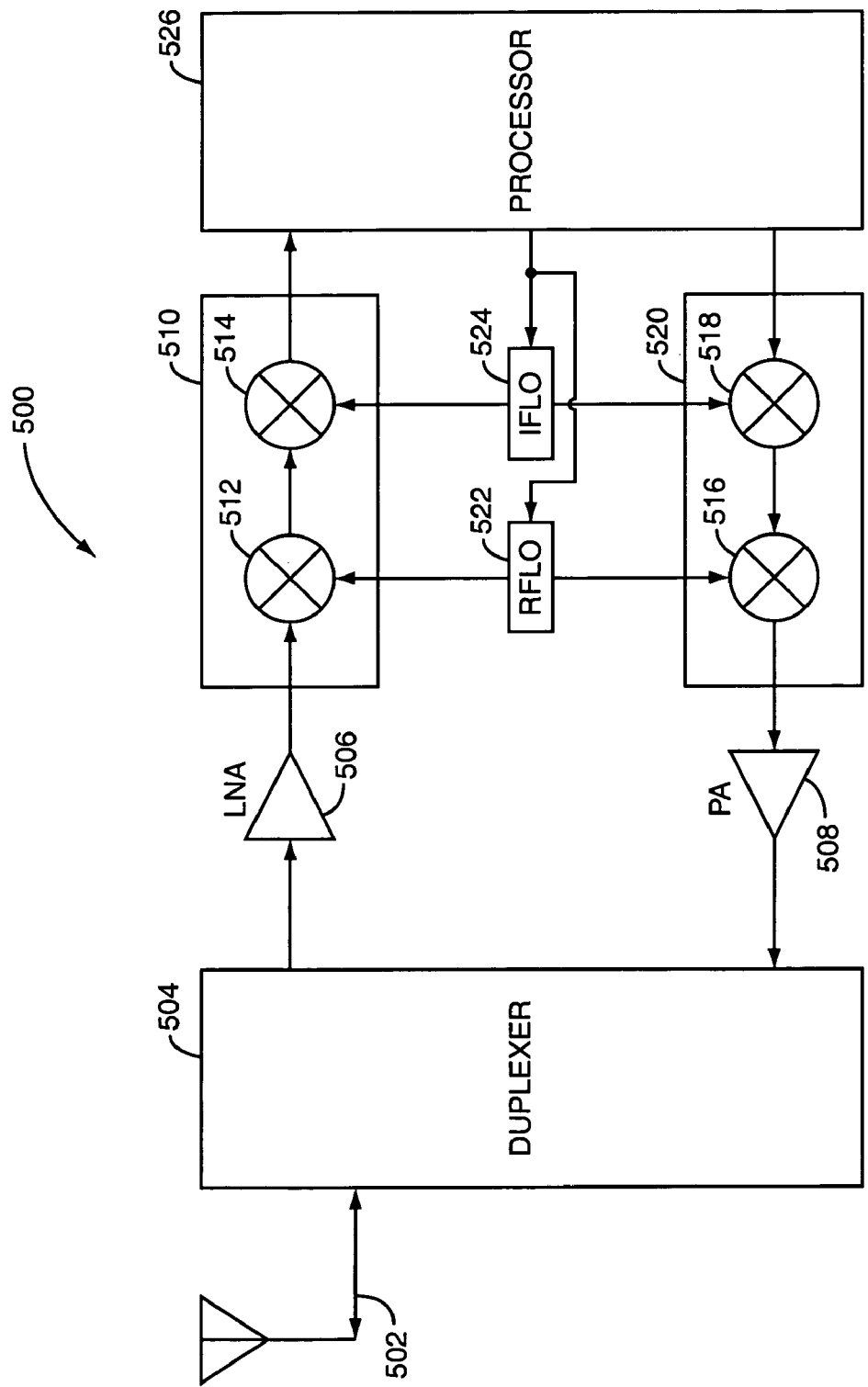
FIG. 5 is a block diagram illustrating a terminal capable of dual mode operation in accordance with one embodiment of the invention.

FIG. 5 illustrates an example architecture for a terminal in accordance with one embodiment of the invention. Terminal 500 comprises an antenna 502 for receiving Radio Frequency (RF) carrier signals. For example, antenna 502 may receive 1×RTT carrier 125 signals and HDR carrier 120 signals. Antenna 502 is also configured to transmit RF signals that are encoded with data to be communicated to the network. Duplexer 504 is coupled to antenna 502 and switches the antenna between receive and transmit paths within terminal 500.

The receive path comprises a Low Noise Amplifier (LNA) 506 that amplifies the received RF carrier signals to a suitable level for further processing. The amplified signal is then passed to a demodulation circuit 510. In a typical receive path, demodulation circuit 510 will consist of two stages. In the first stage, an RF mixer 512 mixes the received RF signal down to an Intermediate Frequency (IF) signal by mixing the RF received signal with an RF Local Oscillator (RFLO) 522 signal. In the second stage, the IF signal is mixed with an IFLO 524 in order to step the IF signal down to a baseband signal. The baseband signal is then coupled to a processor 526 that decodes any data contained in the baseband signal. Generically, processor 526 is typically referred to as a baseband processor.

Conversely, in the transmit path, data to be communicated to the network is encoded onto a baseband signal by processor 526 and coupled to modulation circuit 520. Modulation circuit 520 mixes the baseband signal up to an IF signal in mixer 518 by mixing the baseband signal with IFLO 524. The IF signal is then mixed up to an RF signal in mixer 516 by mixing the IF signal with RFLO 522. The RF signal is then amplified by a Power Amplifier (PA) 508 to ensure that the RF signal transmitted by antenna 502 is of sufficient power.

In the transmit path, RFLO 522 must be tuned to produce the correct RF carrier signal. For example, if terminal 500 is communicating non-real-time packet data, then RFLO 522 must be tuned to produce an RF signal with the appropriate HDR carrier frequency. If, on the other hand, terminal 500 is engaged in voice communication, then RFLO must be tuned to produce a RF signal with the appropriate 1×RTT carrier frequency.

FIG. 5 illustrates that in a typical embodiment, processor 526 controls the tuning of RFLO 522. Processor 526 also tunes IFLO 524 if required; however, IFLO 524 may remain at the same frequency with only RFLO 522 being tuned. In fact, those skilled in the art will understand that some embodiments of terminal 500 may not include IFLO 524 or mixers 514 and 518. In this case, RF mixer 512 converts the received RF carrier directly to baseband, and RF mixer 516 converts the baseband signal coupled from processor 526 directly to an RF signal. This type of architecture is termed direct conversion architecture.

Regardless of the specific architecture, the transmit and receive paths are typically included in one unit termed a transceiver. Therefore, in a typical embodiment, processor 526 is responsible for tuning the transceiver to the appropriate carrier in order to carry out the processes of FIGS. 2, 3, and 4.

While the many aspects of the present invention are susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the scope of the appended claims.

What is claimed is:

1. A method of wireless communication employing a terminal, the terminal configured to tune either to a High Data Rate (HDR) carrier in an HDR network or to a 1× Radio Transmission Technology (1×RTT) carrier in a 1×RTT network, the method comprising:
   tuning the terminal to the HDR carrier;
   establishing a packet data communication over the HDR carrier using the terminal;
   periodically tuning the terminal to the 1×RTT carrier for a limited time in order to check for incoming 1×RTT communications
   sending a 1×RTT packet hand-over request from the terminal to transfer the packet data communication from the HDR carrier to the 1×RTT carrier;
   handing the packet data communication over to the 1×RTT carrier from the HDR carrier; and
   establishing a 1×RTT communication over the 1×RTT carrier when an incoming 1×RTT communication is detected while also maintaining the packet data communication over the 1×RTT carrier; and
   tuning the terminal back to the HDR carrier when the 1×RTT communication is terminated.

2. The method of claim 1, further comprising:
   sending a 1×RTT packet hand-over request from the terminal to transfer the packet data communication from the 1×RTT carrier to the HDR carrier; and
   handing the packet data communication over to the HDR carrier from the 1×RTT carrier.

3. The method of claim 2, wherein the terminal is configured to optionally establish the 1×RTT communication.

4. The method of claim 3, wherein the 1×RTT communication includes at least one of the following:
   a voice communication;
   a SMS communication; and
   a broadcast information communication.

5. A method of wireless communication employing a terminal, the terminal configured to tune either to a High Data Rate (HDR) carrier in an HDR network or to a 1× Radio Transmission Technology (1×RTT) carrier in a 1×RTT network, the method comprising:
   tuning the terminal to the HDR carrier;
   establishing a packet data communication over the HDR carrier using the terminal;

while the packet data communication is in progress, tuning the terminal to the 1×RTT carrier;

sending a 1×RTT packet hand-over request from the terminal to transfer the packet data communication from the HDR carrier to the 1×RTT carrier;

handing the packet data communication over to the 1×RTT carrier from the HDR carrier; and establishing a 1×RTT communication on the 1×RTT carrier, while also maintaining the packet data communication over the 1×RTT carrier.

6. The method of claim 5, further comprising:

tuning the terminal back to the HDR carrier when the 1×RTT communication is terminated in order to complete the packet data communication.

7. The method of claim 5, further comprising:

tuning the terminal back to the HDR carrier when the voice communication is terminated;

sending a 1×RTT packet hand-over request from the terminal to transfer the packet data communication from the 1×RTT carrier to the HDR carrier; and handing the packet data communication over to the HDR carrier from the 1×RTT carrier.

8. The method of claim 7, wherein the 1×RTT communication is at least one of the following:

a voice communication;

a SMS communication; and a broadcast information communication.

9. A method of wireless communication employing a terminal, the terminal configured to tune either to a High Date Rate (HDR) carrier in an HDR network or to a 1× Radio Transmission Technology (1×RTT) carrier in a 1×RTT network, the method comprising:

periodically scanning for the HDR carrier;

tuning a receiver to the 1×RTT carrier;

establishing a packet data communication on the 1×RTT carrier after tuning the receiver to the 1×RTT carrier;

periodically scanning for the HDR carrier once the terminal is tuned to the 1×RTT carrier;

if an HDR carrier is available, tuning the terminal to the HDR carrier; and establishing the packet data communication on the HDR carrier.

10. The method of claim 9, wherein the packet data communication on the 1×RTT carrier is terminated prior to tuning the terminal to the HDR carrier.

11. The method of claim 9, wherein establishing the packet data communication on the HDR carrier comprises:

sending a 1×RTT packet hand-over request from the terminal to transfer the packet data communication from the 1×RTT carrier to the HDR carrier; and handing the packet data communication over to the HDR carrier from the 1×RTT carrier.

12. A terminal for wireless communication, comprising:

a transceiver configured to selectively tune to a High Date Rate (HDR) carrier in an HDR network or to a 1× Radio Transmission Technology (1×RTT) carrier in a 1×RTT network; and a processor configured to tune the transceiver to the HDR carrier for establishing packet data communications and to tune the transceiver to the 1×RTT carrier for establishing 1×RTT communications or packet data communications, and further configured to tune to a 1×RTT carrier when HDR carriers are unavailable and to Periodically scan for HDR carriers until one is available, and wherein the processor is configured to tune to an HDR carrier when one is available.

13. The terminal of claim 12, wherein the processor is further configured to periodically tune the transceiver to the 1×RTT carrier to check for incoming 1×RTT communications while a packet data communication is occurring over the HDR carrier, and wherein the processor is further configured to tune the terminal to the 1×RTT carrier and establish a 1×RTT communication over the 1×RTT carrier when an incoming 1×RTT communication is detected.

14. The terminal of claim 12, wherein the processor is further configured to tune to the 1×RTT carrier, while a packet data communication is taking place over the HDR carrier, and establish a 1×RTT communication over the 1×RTT carrier.

15. The terminal of claim 12, wherein the processor is further configured to initiate a 1×RTT packet hand-over request in order to transfer packet data communications from the HDR carrier to the 1×RTT carrier, or to transfer packet data communications from the 1×RTT carrier to the HDR carrier.

16. The terminal of claim 12, wherein the 1×RTT communications include at least one of the following:

a voice communication;

a SMS communication; and a broadcast information communication.

17. A wireless communications network, comprising:

a 1× Radio Transmission Technology (1×RTT) carrier in a 1×RTT network, said 1×RTT carrier configured to carry 1×RTT communications and packet data communications;

a High Data Rate (HDR) carrier in an HDR network, said HDR carrier configured to carry packet data communications; and a plurality of terminals configured to tune to the HDR carrier for establishing packet data communications and to tune to the 1×RTT carrier for establishing the 1×RTT communications or packet data communications, wherein each terminal is further configured to initiate a 1×RTT packet hand-over request in order to transfer packet data communications from the HDR carrier to the 1×RTT carrier, or to transfer packet data communications from the 1×RTT carrier to the HDR carrier.

18. The network of claim 17, wherein each hand-over request will contain information about a target base station controller associated with the 1×RTT or HDR carrier that is the target of the hand-over.

19. A method of wireless communication employing a terminal, the terminal configured to tune either to a best-effort carrier in a packet-switched network or to an all-service carrier in an all-service network, the method comprising:

tuning the terminal to the best-effort carrier;

establishing a packet data communication over the best-effort carrier using the terminal;

periodically tuning the terminal to the all-service carrier for a limited time in order to check for incoming all-service communications sending a packet hand-over request from the terminal to transfer the packet data communication from the best-effort carrier to the all-service carrier;

handing the packet data communication over to the all-service carrier from the best-effort carrier;

establishing an all-service communication over the all-service carrier when an incoming all-service communication is detected while also maintaining the packet data communication over the all-service carrier; and tuning the terminal back to the best-effort carrier when the all-service communication is terminated.

20. The method of claim 19, further comprising:
sending a packet hand-over request from the terminal to transfer the packet data communication from the all-service carrier to the best-effort carrier; and
handing the packet data communication over to the best-effort carrier from the all-service carrier.

21. The method of claim 20, wherein the terminal is configured to optionally establish the all-service communication.

22. The method of claim 19, wherein the all-service communications include at least one of the following:
a voice communication;
a SMA communication; and
a broadcast information communication.

23. The method of claim 19, wherein the all-service carrier comprises a 1× Radio Transmission Technology (1×RTT) carrier.

24. The method of claim 19, wherein the best-effort carrier comprises a High Data Rate (HDR) carrier.

25. A method of wireless communication employing a terminal, the terminal configured to tune either to a best-effort carrier in a packet-switched network or to an all-service carrier in an all-service network, the method comprising:
tuning the terminal to the best-effort carrier;
establishing a packet data communication over the best-effort carrier using the terminal;
while the packet data communication is in progress, tuning the terminal to the all-service carrier;
sending a packet hand-over request from the terminal to transfer the packet data communication from the best-effort carrier to the all-service carrier;
handing the packet data communication over to the all-service carrier from the best-effort carrier; and
establishing all-service communication on the all-service carrier while also maintaining the packet data communication over the all-service carrier.

26. The method of claim 25, further comprising:
tuning the terminal back to the best-effort carrier when the all-service communication is terminated in order to complete the packet data communication.

27. The method of claim 25, further comprising:
tuning the terminal back to the best-effort carrier when the all-service communication is terminated;
sending a packet hand-over request from the terminal to transfer the packet data communication from the all-service carrier to the best-effort carrier; and
handing the packet data communication over to the best-effort carrier from the all-service carrier.

28. The method of claim 25, wherein the all-service communication is at least one of the following:
a voice communication;
a SMS communication; and
a broadcast information communication.

29. The method of claim 25, wherein the all-service carrier comprises a 1× Radio Transmission Technology (1×RTT) carrier.

30. The method of claim 25, wherein the best-effort carrier comprises a High Data Rate (HDR) carrier.

31. A method of wireless communication employing a terminal, the terminal configured to tune either to a best-effort carrier in a packet-switched network or to an all-service carrier in an all-service network, the method comprising:
periodically scanning for the best-effort carrier;
tuning a receiver to the all-service carrier;
establishing a packet data communication on the all-service carrier after tuning the receiver to the all-service carrier;
periodically scanning for a best-effort carrier once the terminal is tuned to the all-service carrier;
if the best-effort carrier is available, tuning the terminal to the best-effort carrier; and
establishing the packet data communication on the best-effort carrier.

32. The method of claim 31, wherein the packet data communication on the all-service carrier is terminated prior to tuning the terminal to the best-effort carrier.

33. The method of claim 31, wherein establishing the packet data communication on the best-effort carrier comprises:
sending a packet hand-over request from the terminal to transfer the packet data communication from the all-service carrier to the best-effort carrier; and
handing the packet data communication over to the best-effort carrier from the all-service carrier.

34. The method of claim 31, wherein the all-service carrier comprises a 1× Radio Transmission Technology (1×RTT) carrier, and wherein the best-effort carrier comprises a High Data Rate (HDR) carrier.

35. A terminal for wireless communication, comprising:
a transceiver configured to selectively tune to a best-effort carrier in a packet-switched network or to an all-service carrier in an all-service network; and
a processor configured to periodically tune the transceiver to the all-service carrier to check for an incoming all-service communication while a packet data communication is occurring over the best-effort carrier and to tune the terminal to the all-service carrier and establish an all-service communication over the all-service carrier when an incoming all-service communication is detected, and further configured to tune to an all-service carrier when best-effort carriers are unavailable and to periodically scan for best-effort carriers until one is available, and wherein the processor is configured to tune to a best-effort carrier when one is available.

36. The terminal of claim 35, wherein the processor is further configured to tune to the all-service carrier, while a packet data communication is taking place over the best-effort carrier, and establish an all-service communication over the all-service carrier.

37. The terminal of claim 35, wherein the processor is further configured to initiate a packet hand-over request in order to transfer packet data communications from the best-effort carrier to the all-service carrier, or to transfer packet data communications from the all-service carrier to the best-effort carrier.

38. The terminal of claim 35, wherein the all-service communication is at least one of the following:
a voice communication;
a SMS communication; and
a broadcast information communication.

39. The terminal of claim 35, wherein the all-service carrier comprises a 1× Radio Transmission Technology (1×RTT) carrier.

40. The method of claim 35, wherein the best-effort carrier comprises a High Data Rate (HDR) carrier.

41. The terminal of claim 35, wherein the all-service carrier supports real-time and non-real-time services, and wherein the best-effort carrier supports only non-real-time services.

42. The terminal of claim 41, wherein the all-service carrier is optimized for circuit switched services, and wherein the best-effort carrier optimized for best effort packet data services.

43. The terminal of claim 42, wherein the control and data channels in the best effort carrier are time multiplexed.

44. A wireless communication network comprising:
an all-service carrier configured to carry all-service communications and packet data communications in an all-service network;
a best-effort carrier configured to carry packet data communications in a packet-switched network; and
a plurality of terminals configured to periodically tune to the all-service carrier to check for an incoming all-service communication while a packet data communication is occurring over the best-effort carrier and to tune to the all-service carrier and establish an all-service communication over the all-service carrier when the incoming all-service communication is detected, wherein each terminal is further configured to initiate a Packet hand-over request in order to transfer packet data communications from the best-effort carrier to the all-service carrier, or to transfer packet data communications from the all-service carrier to the best effort carrier.

45. The network of claim 44, wherein each hand-over request will contain information about a target base station controller associated with the all-service or best-effort carrier that is the target of the hand-over.

46. The network of claim 44, wherein the all-service carrier supports real-time and non-real-time services, and wherein the best-effort carrier supports only non-real-time services.

47. The network of claim 46, wherein the all-service carrier is optimized for circuit switched services, and wherein the best-effort carrier is optimized for best effort packet data services.

48. The network of claim 47, wherein the control and data channels in the best-effort carrier are time multiplexed.

49. The network of claim 44, wherein the all-service carrier is a 1× Radio Transmission Technology (1×RTT) carrier.

50. The network of claim 44, wherein the best-effort carrier is a High Data Rate (HDR) carrier.

* * * * *

UNITED STATES PATENT AND TRADEMARK OFFICE
CERTIFICATE OF CORRECTION

PATENT NO. : 7,054,290 B1
APPLICATION NO. : 09/693575
DATED : May 30, 2006
INVENTOR(S) : Djuphammar It is certified that error appears in the above-identified patent and that said Letters Patent is hereby corrected as shown below:

On the Title Page, in Field (58), under "Field of Classification Search", in Column 1, Line 3, after "455/436" delete "432".

In Column 6, Line 35, in Claim 1, after "communications" insert -- ; --.

In Column 7, Line 55, in Claim 12, after "High" delete "'Date'' and insert -- Data --, therefor.

In Column 7, Line 65, in Claim 12, delete "Periodically" and insert -- periodically --, therefor.

In Column 8, Line 58, in Claim 19, after "communications" insert -- ; --.

In Column 9, Line 16, in Claim 22, after "a" delete "SMA" and insert -- SMS --, therefor.

In Column 11, Line 7, in Claim 42, after "carrier" insert -- is --.

Signed and Sealed this

Thirty-first Day of March, 2009

JOHN DOLL
*Acting Director of the United States Patent and Trademark Office*